United States Patent [19]

Tobias et al.

[11] 4,393,121

[45] Jul. 12, 1983

[54] POLYESTER COIL COATING

[75] Inventors: Michael A. Tobias, Bridgewater; Conrad L. Lynch, Metuchen, both of N.J.

[73] Assignee: Mobil Oil Corporation, New York, N.Y.

[21] Appl. No.: 323,518

[22] Filed: Nov. 23, 1981

[51] Int. Cl.³ .................... B32B 15/08; C08G 63/16; C08L 67/02

[52] U.S. Cl. .................................. 428/458; 524/413; 524/539; 524/604; 528/302

[58] Field of Search ...................... 524/413, 604, 539; 528/302; 428/458

[56] References Cited

U.S. PATENT DOCUMENTS 3,668,275 6/1972 Riemhofer et al. ................. 528/302
3,668,277 6/1972 Riemhofer et al. ................. 528/302
3,804,920 4/1974 Cunningham et al. ............. 260/850
3,829,530 8/1974 Powanda ............................ 260/850
3,852,375 12/1974 Biethan et al. ..................... 260/850
4,072,662 2/1978 van der Linde et al. ........ 260/75 R
4,107,150 8/1978 Campbell et al. .................. 528/302
4,140,729 2/1979 Tobias et al. ...................... 260/850
4,179,420 12/1979 Laganis ............................. 528/302

Primary Examiner—Lewis T. Jacobs
Attorney, Agent, or Firm—Charles A. Huggett; Michael G. Gilman; Edward J. Trojnar

[57] ABSTRACT

This invention provides a linear thermosettable polyester based upon 10–20 weight percent cyclohexanedimethanol, 10–16 weight percent adipic acid, 12–16 weight percent neopentyl glycol, 12–16 weight percent propylene glycol or butanediol, and 40–48 weight percent isophthalic acid component.

8 Claims, No Drawings

POLYESTER COIL COATING

BACKGROUND OF THE INVENTION

1. Field of the Invention

This invention is concerned with thermosetting polyester coating compositions.

2. Description of the Prior Art

In U.S. Pat. No. 4,140,729, there is disclosed linear polyesters having a high aromatic content which, when combined with an aminoplast to form a coating composition and cured, provide a hard, flexible coating. Generally, however, the gloss is relatively low.

The present invention provides a coating composition containing different polyesters which gives a coating having high gloss and flexibility. These properties are possibly attributable to the particular combination of diols used.

SUMMARY OF THE INVENTION

This invention provides a linear thermosettable polyester based upon 10-20 weight percent cyclohexanedimethanol, 10-16 weight percent adipic acid, 12-16 weight percent neopentyl glycol, 12-16 weight percent propylene glycol or butanediol, and 40-48 weight percent isophthalic acid component.

DESCRIPTION OF SPECIFIC EMBODIMENTS

Polyester Resins

One glycol component of the polyester resins is, specifically, cyclohexandimethanol. It is used in an amount between about 10 weight percent and about 20 weight percent, based upon the total weight of the reactants.

Another glycol component is neopentyl glycol. It is used in an amount of between about 12 weight percent and about 16 percent, based upon the total weight of the reactants.

Another glycol component is 1,3-butanediol or 1,2-propanediol. This glycol component is used in an amount between about 12 weight percent and about 16 weight percent, based upon the total weight of the reactants.

The isophthalic acid component is isophthalic acid or mixtures of isophthalic acid and phthalic anhydride which mixtures contain between about 50 weight percent and about 70 weight percent isophthalic acid. The amount of isophthalic acid component used is between about 40 weight percent and about 48 weight percent, based upon the total weight of the reactants.

Adipic acid is a component of the polyester resins of this invention. The amount of adipic acid can be between 10 weight percent and about 16 weight percent of the total weight of the reactants.

The esterification reaction is carried out at temperatures between about 225° C. and about 250° C., for a period of time between about 2 hours and about 10 hours. An esterification catalyst can be used, such as dibutyltin oxide, dibutyltin dilaurate, and triphenyl phosphite, in catalytic amounts (0.05-0.2 weight percent). During the late stages of the esterification reaction, it is advantageous to use an aromatic hydrocarbon, such as toluene or xylene, to remove the remaining water of esterification by azeotropic distillation. After the reaction is complete, the polyester is reduced to about 60 weight percent non-volatile material (NVM) with an aromatic petroleum solvent boiling within the range of 150°-270° C. The resultant resin will have a number average molecular weight of 1,500-5,000 and a combined acid number and hydroxyl number of 20-70 mg. KOH per gram of polyester.

Coating Compositions

The essential components of the coating compositions of this invention are the polyester resin, an aminoplast, an acid catalyst, and an organic solvent.

The material used to thermoset the coating is conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins, and other aminoplast aldehyde resins such as those triazine resins produced by the reaction of an aldehyde with formoguanamine, ammeline, 2-chloro-4,6-diamino-1,3-triazine, 6-methyl-2,4-diamino-1,3,5-triazine, 2,4,6-trihydrazine-1,3,5-triazine, and 2,4,6-triethyl-triamino-1,3,5-triazine. Generally, such resins are alkylated with an alcohol, such as methanol or butanol. As aldehydes used to react with the amino compounds to form the resinous material, one may use such aldehydes as formaldehyde, acetaldehyde, crotonaldehyde, acrolein, or compounds which engender aldehydes, such as hexamethylenetetramine, paraldehyde, paraformaldehyde, and the like. The amount of aminoplast used is between about 10 weight percent and about 20 weight percent on resin solids.

The acid catalyst can be the acid itself or a derivative that will generate the acid in situ, such as commercially available Aerosol OT which generates sulfonic acid and $NH_4NO_3$ which can be decomposed to $HNO_3$. Acids that generally are used to cure aminoplast systems include p-toluene sulfonic acid (pTSA), benzenesulfonic acid, methylsulfonic acid, cyclohexyl sulfonic acid, phosphoric acid, mono- or dialkyl acid phosphates, and many others indicated in the art as suitable curing catalysts. The amount of acid catalyst used usually is between about 0.1 weight percent and 1.0 weight percent, based upon total resin solids.

The solvents utilizable in the coating compositions of this invention are the usual volatile solvents used in paints and enamels. Aromatic hydrocarbons are utilizable, such as toluene, xylene, and aromatic petroleum cuts, e.g., Hi-Sol 4-1 (boils 190.6°-260.0° C.) and Solvesso 150 (boils 184.4°-210.0° C.). Ketones utilizable include methyl isobutyl ketone (MIBK), isophorone, ethyl amyl ketone, and methyl n-amyl ketone. Alcohols are utilizable, such as butanol, amyl alcohol, 2-ethylhexanol, and cyclohexanol. Also utilizable are the ether alcohols and their acetate esters, such as methoxyethanol, ethoxyethanol, butoxyethanol, hexoxyethanol, methoxypropanol, methoxyethyl acetate, and ethoxyethyl acetate. It is within the contemplation of this invention to use mixtures of two or more solvents. The proportion of solvents used is not critical, since they are the volatile vehicle to convey the solid material to the substrate to be coated. The total amount of solvents used will be sufficient to provide a solids content (% NVM) of between about 50 weight percent and about 75 weight percent in the finished coating composition.

It is preferred to incorporate a pigment into the coating composition of this invention. The preferred pigment is titanium dioxide, but any well-known pigment can be used, such as zinc oxide, bentonite, silica, ochers, and chrome yellows, greens, oranges, etc. Sufficient pigment is used to provide an opaque or colored film as needed for the desired appearance.

Other well-known adjuvants may be added to the coating composition, such as flow control agents, wetting agents, and waxes.

The coating compositions of this invention can be applied to the usual substrates, i.e., metal, paper, leather, cloth, etc., using any of the usual methods of application including spraying, direct rollcoating, reverse rollcoating, electrodeposition, flow coating, and the like. The coating composition is primarily useful for coating aluminum, steel, tin plated steel, electrogalvanized steel, and hot dipped galvanized steel. Such metal substrates are usually cleaned and chemically treated to improve the wetting and adhesion of subsequent organic coatings. The coating compositions of this invention are equally useful for primers or topcoats with either the same or different types of resinous compositions. After coating the substrate, the coating is baked for about 5 seconds to about 25 minutes at between about 250° F. and about 600° F. (121°–315° C.). A typical fast bake is for about 40 seconds at about 420° F. (215° C.).

The following examples demonstrate the preparation of the polyester resins of this and coating compositions containing them, along with performance characteristics of such coatings.

EXAMPLE 1

A 5 liter glass flask was charged with 411 grams of neopentyl glycol, 411 grams of 1,3-butanediol, 450 grams of 1,4-cyclohexanedimethanol, 330 grams of adipic acid, 1398 grams of isophthalic acid and 3 grams of dibutyltin oxide. The contents of the reaction vessel were gradually heated to 235° C. while removing the water of reaction through a steam jacketed distillation column. When an acid number of 32.2 was obtained, 75 grams of toluene were added to azeotropically remove the remaining water produced by esterification. The reaction was continued until an acid number of 1.4 was obtained. The resulting polyester was reduced to 64.9 percent non-volatiles by the addition of Solvesso 150 solvent to afford a material with an acid number of 1.3 (on non-volatiles), a hydroxy number of 30.1, a Gardner Holdt viscosity of Z3–Z4, a Gardner Color of 1, and a weight per gallon of 8.98.

EXAMPLE 2

Paint was made from the resin solution from Example 1 by combining it with 15% of hexamethoxymethyl melamine crosslinker on resin solids, pigmenting it with $TiO_2$ pigment at a 1:1 pigment:resin solids ratio and reducing it to 66.2% NVM with 1:1 Isophorone/Solvesso 150. It was catalyzed with 1.2% of a 20% pTSA solution based on the resin solids. This paint was coated on 20 mil Bonderite 901 treated cold rolled steel at 0.9 mils dry film thickness and baked for 40 seconds at 215° C. The cured coating had 93 gloss, an H-2H Pencil Hardness, a 14.7 Knoop Hardness Number, and passed a 160 in-lb reverse impact and a 1T-bend fabrication test plus Scotch tape without any fractures or loss of adhesion.

The same paint coated on 25 mil Alodine 1200 treated aluminum at 0.9 mils DFT and baked for 40 seconds at 215° C. passed a 24 hour boiling deionized water test without any softening or loss of gloss.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A linear thermosettable polyester resin based upon 10–20 weight percent cyclohexanedimethanol, 10–16 weight percent adipic acid, 12–16 weight percent neopentyl glycol, 12–16 weight percent propylene glycol or butanediol, and 40–48 weight percent isophthalic acid component.

2. The polyester resin of claim 1, wherein said isophthalic acid component is isophthalic acid.

3. A coating composition comprising
(A) a linear thermosettable polyester resin based upon 10–20 weight percent cyclohexanedimethanol, 10–16 weight percent adipic acid, 12–16 weight percent neopentyl glycol, 12–16 weight percent propylene glycol or butanediol, and 40–48 weight percent isophthalic acid component,
(B) between about 10 weight percent and about 20 weight percent on resin solids of an aminoplast,
(C) between about 0.1 and about 1 weight percent on resin solids of an acid catalyst, and
(D) an inert organic solvent in an amount sufficient to provide a solids content of between about 50 weight percent and about 75 weight percent.

4. The composition of claim 3 containing a pigment.

5. The composition of claim 4, wherein said pigment is titanium dioxide.

6. A coating composition comprising
(A) a linear thermosettable polyester resin based upon 10–20 weight percent cyclohexanedimethanol, 10–16 weight percent adipic acid, 12–16 weight percent neopentyl glycol, 12–16 weight percent propylene glycol or butanediol, and 40–48 weight percent isophthalic acid component,
(B) between about 10 weight percent and about 20 weight percent on resin solids of an aminoplast which is hexamethoxymethylmelamine,
(C) between about 0.1 and about 1 weight percent on resin solids of an acid catalyst, and
(D) an inert organic solvent in an amount sufficient to provide a solids content of between about 50 weight percent and about 75 weight percent.

7. A metal substrate coated with a coating composition of claim 3 and baked.

8. A metal substrate coated with a coating composition of claim 6 and baked.

* * * * *